(12) United States Patent
Preisler et al.

(10) Patent No.: US 6,890,023 B2
(45) Date of Patent: May 10, 2005

(54) REINFORCED COMPOSITE INNER ROOF PANEL OF THE CELLULAR CORE SANDWICH-TYPE AND METHOD OF MAKING SAME

(75) Inventors: Darius J. Preisler, Macomb, MI (US); William G. Hofmann, Grosse Pointe Park, MI (US); Phillip J. Kusky, Farmington Hills, MI (US)

(73) Assignee: Patent Holding Company, Fraser, MI (US)

( * ) Notice: Subject to any disclaimer, the term of this patent is extended or adjusted under 35 U.S.C. 154(b) by 0 days.

(21) Appl. No.: 10/126,130

(22) Filed: Apr. 19, 2002

(65) Prior Publication Data

US 2003/0197400 A1 Oct. 23, 2003

(51) Int. Cl.[7] ............................................. B60R 13/02
(52) U.S. Cl. ...................................... 296/214; 296/210
(58) Field of Search ............................... 296/214, 211, 296/210, 208, 39.1, 191, 901, 100.02, 100.06, 193.03, 193.04, 196, 197

(56) References Cited

U.S. PATENT DOCUMENTS

| | | |
|---|---|---|
| 3,709,968 A | 1/1973 | Houghton |
| 4,315,050 A | 2/1982 | Rourke |
| 4,702,688 A | 10/1987 | Schenk |

(Continued)

FOREIGN PATENT DOCUMENTS

| | | |
|---|---|---|
| DE | 1 299 853 | 9/1967 |
| DE | 197 41 917 A1 | 9/1997 |
| EP | 0 551 776 A1 | 1/1992 |

(Continued)

OTHER PUBLICATIONS

D'Hooghe, E.L., et al., Applications For Fulcrum Thermoplastic Composite Technology, The Dow Chemical Company.

D'Hooghe, E.L., et al., Thermoplastic Composite Technology; Tougher Than You Think, The Dow Chemical Company, Advanced Materials, Dec. 1, 2000, vol. 12, No. 23, pp. 1865–1868.

Edwards, Chris, Thermoplastic Pultrusion Promises New Synergies, Reinforced Plastics, vol. 45, No. 4, Arpil 2001.

Rules of Composite Technology, Fulcrum Thermoplastic Composite Technology, The Dow Chemical Company, Midland, Michigan, Dec. 2000, pp. 1–5.

The Dow Chemical Company, Fulcrum Thermoplastic Composite Technology, http://www.dow.com/fulcrum/index.htm.

Dow Plastics, Typical Properties For Composites Produced Using Fulcrum Thermoplastic Composite Technology.

U. Breuer, et al., Deep Drawing of Fabric–Reinforced Thermoplastics: Wrinkle Formation and Their Reduction, Polymer Composites, Aug. 1996, vol. 17, No. 4.

*Primary Examiner*—Lori L. Coletta
(74) *Attorney, Agent, or Firm*—Brooks Kushman P.C.

(57) ABSTRACT

The invention relates to reinforced composite inner roof panels of the sandwich-type having a cellular core. In a method for making a inner roof panel of the invention, a stack is formed that is made up of: an upper skin made of a reinforced thermoplastic material; a cellular core made of a thermoplastic material; and a bottom skin made of a reinforced thermoplastic material. The upper and lower skins and the cellular core are formed together and have regions of reduced thickness and regions of increased thickness that may provide head impact absorbing characteristics or form structural components of the passenger compartment. Examples of structural components that may be formed include HVAC ducts, wiring conduits, video display panel mounts or air bag receptacles.

13 Claims, 2 Drawing Sheets

U.S. PATENT DOCUMENTS

| | | | |
|---|---|---|---|
| 4,937,125 A | | 6/1990 | Sanmartin et al. |
| 5,199,595 A | | 4/1993 | Muggli et al. |
| 5,217,563 A | | 6/1993 | Niebling et al. |
| 5,326,615 A | * | 7/1994 | Tsuchihashi et al. ........ 296/214 |
| 5,494,737 A | * | 2/1996 | Sakai et al. ................. 296/214 |
| 5,597,218 A | * | 1/1997 | Lechman ................. 312/223.3 |
| 5,709,925 A | | 1/1998 | Spengler et al. |
| 5,795,015 A | * | 8/1998 | Corpe et al. ................ 296/214 |
| 5,825,096 A | * | 10/1998 | Morimoto et al. .......... 296/214 |
| 5,853,843 A | * | 12/1998 | Patel et al. .................. 296/214 |
| 5,876,654 A | | 3/1999 | Blonigen et al. |
| 5,888,610 A | | 3/1999 | Fournier et al. |
| 5,891,560 A | | 4/1999 | Edwards et al. |
| 5,976,646 A | * | 11/1999 | Stevens et al. ............. 296/214 |
| 6,036,252 A | | 3/2000 | Hecksel et al. |
| 6,039,351 A | | 3/2000 | Jones et al. |
| 6,045,174 A | | 4/2000 | Brancaleone et al. |
| 6,050,630 A | | 4/2000 | Hochet |
| 6,053,566 A | | 4/2000 | Aghssa et al. |
| 6,062,635 A | * | 5/2000 | Learman et al. ............ 296/214 |
| 6,065,795 A | | 5/2000 | Forster et al. |
| 6,086,145 A | * | 7/2000 | Wandyez ................... 296/214 |
| 6,126,219 A | | 10/2000 | Wilkinson et al. |
| 6,127,021 A | * | 10/2000 | Kelman ...................... 296/211 |
| 6,128,815 A | | 10/2000 | Jurica et al. |
| 6,136,259 A | | 10/2000 | Puffenberger |
| 6,165,604 A | | 12/2000 | Edwards et al. |
| 6,168,231 B1 | * | 1/2001 | Fielding et al. ............ 296/210 |
| 6,170,905 B1 | | 1/2001 | Jurica |
| 6,179,362 B1 | | 1/2001 | Wisniewski et al. |
| 6,187,411 B1 | | 2/2001 | Palmer |
| 6,209,205 B1 | | 4/2001 | Rumpel et al. |
| 6,299,244 B1 | * | 10/2001 | Tarahomi .................... 296/210 |
| 6,409,210 B1 | * | 6/2002 | Emerling ..................... 296/214 |
| 6,457,768 B1 | * | 10/2002 | Schroeder et al. .......... 296/214 |
| 6,475,937 B1 | * | 11/2002 | Preisler et al. .............. 296/214 |

FOREIGN PATENT DOCUMENTS

| | | |
|---|---|---|
| EP | 0 473 422 A1 | 3/1992 |
| EP | 0 649 736 A1 | 4/1995 |
| EP | 0 783 959 A2 | 7/1997 |
| EP | 0 894 611 A1 | 7/1997 |
| EP | 0 903 216 A2 | 9/1997 |
| EP | 0 847 912 A1 | 6/1998 |
| EP | 0 855 309 A1 | 7/1998 |
| EP | 0 891 917 A1 | 1/1999 |
| FR | 2 436 675 | 9/1978 |
| FR | 2 686 042 | 7/1993 |
| FR | 2711573 | 5/1995 |
| FR | 2 763 881 | 12/1998 |
| FR | 2 791 628 | 10/2000 |
| JP | 59109467 | 6/1984 |
| JP | 408 112 856 A | 5/1996 |
| WO | WO 8803086 | 5/1988 |
| WO | WO 98/04398 | 2/1998 |

* cited by examiner

REINFORCED COMPOSITE INNER ROOF PANEL OF THE CELLULAR CORE SANDWICH-TYPE AND METHOD OF MAKING SAME

CROSS-REFERENCE TO RELATED APPLICATIONS

This application is related to U.S. application Ser. No. 10/016,274 filed Oct. 30, 2001, entitled "A Reinforced Composite Vehicle Load Floor Of The Cellular-Core Sandwich Type" and U.S. application Ser. No. 09/485,142, filed Jun. 3, 1999, entitled "A Method of Making a Reinforced Composite Panel of the Cellular-Core Sandwich Type and a Panel Obtained By Performing Such a Method." This application is also related to U.S. application Ser. No. 09/960,436 filed Sep. 21, 2001 and entitled "Engine Under Tray for a Vehicle With Improved Strength" and U.S. application Ser. No. 09/525,785, filed Mar. 15, 2000, entitled "Method and System for Molding Thermoplastic Sandwich Material and Deep-Drawn Article Produced Thereby."

BACKGROUND OF THE INVENTION

1. Field of the Invention

The present invention relates generally to an inner roof panel for a removable hardtop for a vehicle that is made with a sandwich-type composite structure having a cellular core and, in particular, to such an inner roof panel that is formed with varied thicknesses being provided in selected areas for special purposes.

2. Background Art

Panels of sandwich-type composite structures having a cellular core have favorable weight and strength characteristics. Such panels are in common use in shipbuilding, aircraft construction, and rail vehicle construction. In the field of aircraft construction, sandwich structure composite panels are made that are based on thermoset resins reinforced with glass fibers. Non-uniform mechanical stresses to which they are subjected sometimes makes it necessary to form local reinforcing plies at those places in the panels where the mechanical stresses are concentrated.

In order to impart the desired shapes to the panels, and to maintain the shapes, the glass fibers and the thermoset resin (in the form of pre-impregnates) are deposited layer-by-layer in a mold, and are then heated to high temperatures so as to cure (i.e. polymerize) the resin permanently.

The first step in making locally-reinforced panels is to define zones where stresses are concentrated in the resulting panels, such zones being defined either by real testing or by computer simulation. After the zones are defined reinforcing plies are added at those places so as to make it possible to withstand such stresses.

The reinforcing plies may have oriented mats of woven fabrics of glass fibers, carbon fibers, or natural fibers embedded in a thermoset resin. The orientation of the fibers is selected according to the location of the stresses. The reinforcing plies are cut out to a pattern using special machines, e.g. water-jet cutting machines. The reinforcing plies are disposed layer-by-layer in a mold, either manually or by means of a robot, with each ply having a preferred orientation.

The next step is a baking step. The baking step is the step having the longest duration of the method of making such pieces because the stack of layers must be heated throughout while in the mold.

After baking the layers of thermoset material and reinforcing fibers disposed in the mold are pressed in the mold by evacuating the mold. Such evacuation presses the materials against the die or the punch to form into the desired shape and remove surplus resin. The desired shape panel is obtained with the reinforcing fibers being throughly impregnated with the resin.

This "lamination" technique, and in particular the "laying up" operation, is characterized by a very low level of automation, and a large labor input. This lamination technique makes it possible to achieve high strength performance levels but requires rigorous monitoring of quality. This technique is very costly and cannot be used at the high production volumes required in many fields such as the automobile industry.

Plastics processing technology has enjoyed significant recent advances, such that traditional high-strength materials such as metals are being replaced with fiber composite materials. These materials are not only light, but also are flexible and durable.

Thermoplastic composites have potential for solving many of the problems associated with thermosets. For example, unlike thermosets, thermoplastic can be reshaped, welded, staked, or thermoformed. Furthermore, thermoplastic are generally tougher, more ductile, and have greater elongation than thermosets.

SUMMARY OF THE INVENTION

An object of the present invention is to provide a reinforced composite inner roof panel of the cellular core sandwich-type which can be made simply and inexpensively, and can be implemented with high production techniques.

In carrying out the above object and other objects of the present invention, a reinforced composite inner roof panel of the sandwich type having a cellular core is disclosed. The inner roof panel includes: a) an upper skin made of a reinforced thermoplastic material; b) a cellular core made of a thermoplastic material; and c) a bottom skin made of a reinforced thermoplastic material. The upper and lower skins and the cellular core are formed together into a concave shape relative to the passenger compartment of the vehicle and have regions of increased thickness that may provide head impact absorbing characteristics or other structural components.

The inner roof panel may include at least one outer covering layer made of a woven or non-woven fabric disposed on the lower surface of the bottom skin such that the inner roof panel is covered with an integral headliner.

The inner roof panel substantially conforms to the general shape of the outer roof panel and may be made in a single pressing stage. The single pressing stage may have a forming pressure for forming the inner roof panel which lies in the range $10^6$ Pa to $3 \times 10^6$ Pa. The skins may have a forming temperature in the range approximately 160° C. to 200° C. while the inner roof panel is formed. Alternatively, if the inner roof panel is a deep-drawn inner roof panel, a pair of pressing stages may be used to form the inner roof panel.

The skins may be made of a woven fabric or mat of reinforcing fibers and a thermoplastic material. The composite may include a depolymerizable and repolymerizable thermoplastic polymer resin. For example, the resin may be a thermoplastic polyurethane or a polyolefin, such as polypropylene.

The cellular core of the inner roof panel may have an open-celled structure of the tubular or honeycomb cell type, constituted mainly of a polyolefin such as polypropylene.

The inner roof panel may be a structural component of a vehicle passenger compartment and may be formed to accommodate or define heating, ventilation and air conditioning (HVAC) ducts, video display mounts, wiring conduit and side curtain air bag pockets. To form such structures the inner roof panel may have predetermined regions of varied thickness.

The thickness of the inner roof panel may vary by more than five times. For example, the roof inner panel may be 3 millimeters thick over most of its surface area and locally thickened to 15 millimeters to form a HVAC duct or other structure.

The above object and other objects, features, and advantages of the present invention are readily apparent from the following detailed description of the best mode for carrying out the invention when taken in connection with the accompanying drawings.

DETAILED DESCRIPTION OF THE PREFERRED EMBODIMENTS

Figure 1:
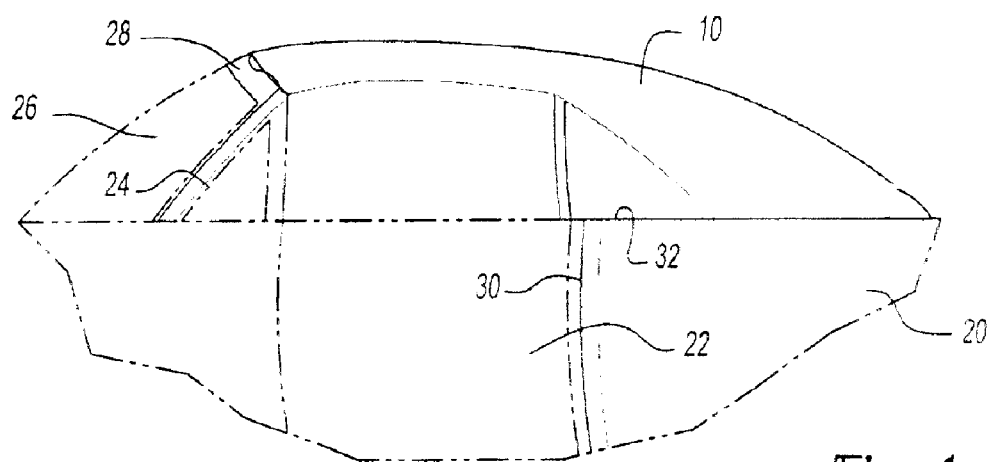
FIG. 1 is a fragmentary side elevation view of a vehicle having a removable hardtop.
Figure 2:
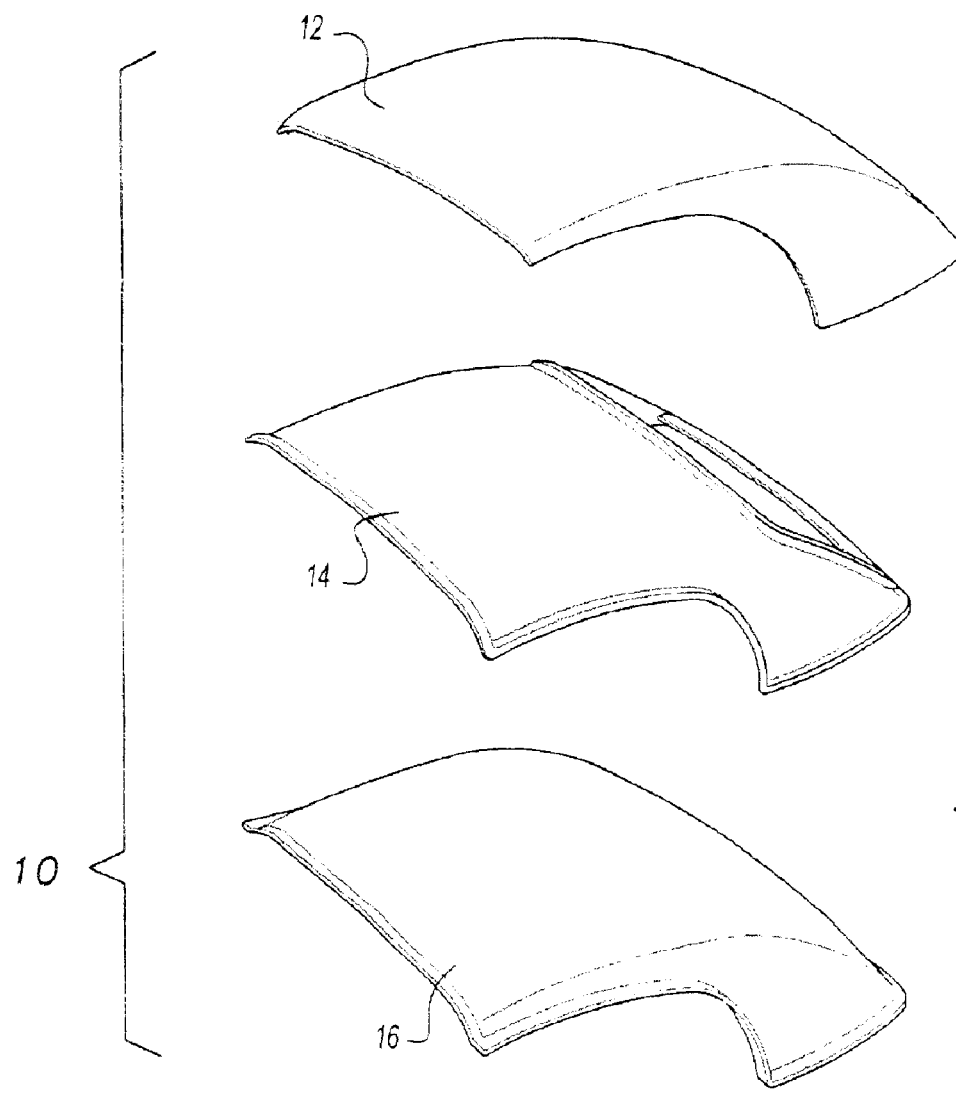
FIG. 2 is a simplified exploded view of a removable roof having an outer roof panel, an inner roof panel and a headliner.

Referring now to FIGS. 1 and 2, a removable roof assembly 10 is shown that includes an outer roof panel 12 and a molded inner roof panel 14 that are secured together. A headliner 16 is preferably clipped, fastened, or bonded to the inner roof panel 14 on the opposite side from the outer roof panel 12. The roof assembly 10 is adapted to be secured to a convertible vehicle 20. Vehicle 20 includes a door 22 that provides ingress and egress to the front seat (not shown) of the vehicle 20. It should be understood that the present invention may be used with either two-door or four-door vehicles.

The following description and the drawings illustrate the component parts for the left side but does not in every instance describe or illustrate the corresponding right side parts for clarity and brevity. It should be understood that the right side includes mirror image parts corresponding to the left side parts described. When reference is made to a side part it should be understood that both right and left sides are generally provided in the completed assembly.

Referring to FIG. 1, vehicle 20 including the roof assembly 10 is shown to illustrate the environment of the roof assembly of the present invention. The door 22 of the vehicle 20 is connected by a hinge to the A pillar 24 of the vehicle 20 rearward of the windshield 26. The windshield 26 includes a header 28 to which the roof assembly 10 is joined as will be more particularly described below. The vehicle also includes a B pillar 30 that terminates at the belt line 32 of the vehicle.

Figure 3:
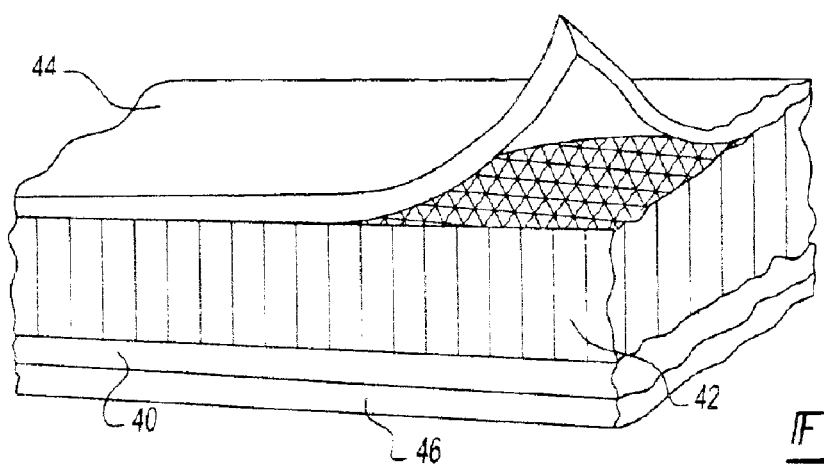
FIG. 3 is a side schematic view of a stack of layers of an inner roof panel of the present invention wherein the top layer is partially removed.

FIG. 3 shows a stack formed during a first step of a method of making a reinforced composite inner roof panel of the cellular core sandwich-type of the present invention. In this example, the stack is made up successively of: a bottom skin 40 made of a reinforced thermoplastic material; a cellular core 42 made of thermoplastic material; and a load-bearing upper skin 44 made of a reinforced thermoplastic material.

In addition, the stack may include a lower layer 46 made of a woven or non-woven material disposed on lower surface bottom skin 40. The lower covering layer 46 may be made of felt or of fabric such as polypropylene fabric.

The skins 40 and 44 are typically made of glass fiber reinforced thermoplastic material. The cellular core 42 is an open-celled structure of the type made up of tubes or of a honeycomb, and it is made mainly of a polyolefin such as polypropylene.

In a first step of the method of making the inner roof panel 14, the fiber mats, honeycomb and skins are cut to size. In a second step of the method of making the inner roof panel 14, the stack of layers is pre-assembled in a mold. Then, the pre-assembled stack is heated in an oven.

The pre-assembled stack is heated such that the skins 40 and 44 of the stack have a forming temperature approximately in the range of 160° C. to 200° C. The temperatures to which the pre-assembled stack is heated are higher than the degradation temperature of the polypropylene constituting the matrices of the skins 40 and 44, as well as the matrices of the cellular core 42. Heating is controlled so that the mechanical characteristics of the resulting inner roof panel 14 are not degraded.

The temperature to which the pre-assembled stack is heated in the method of making the inner roof panel 14 are at least above a temperature enabling the skins 40 and 44 to be bonded to the cellular core 42, in a time compatible with mass production constraints, without the cellular core 42 of the stack being weakened. Accordingly, the maximum temperature that the stack is heated to must avoid degrading the polypropylene.

In the method of making the inner roof panel 14, it is possible to add the reinforcing slats to the stack that is to be thermoformed to make the inner roof panel 14. The method offers a heating capability that is sufficient to bond the skins 40 and 44 which may be of different thicknesses.

For a given pre-assembled stack temperature and a given pre-assembled stack-heating time, it is possible to bond a skin of given thickness. If the skin is too thin, it reaches a temperature such that it is degraded. If the skin is too thick, the heat does not arrive in sufficient quantity to enable the skin and the core to be bonded together.

For example, in order to bond a skin made of a 4×1 woven fabric of weight per unit area of 915 g/m$^2$ to a cellular core, provision is made for the heating time to lie in the range 55 seconds to 75 seconds. By using an identical skin of weight per unit area of 1,420 g/m$^2$, a heating time lying in the range 70 seconds to 85 seconds is necessary to bond the skin to the cellular core without degrading it. Similarly, it has been determined that, for an identical skin having a weight per unit area of 710 g/m$^2$, a heating time lying in the range 55 seconds to 65 seconds is necessary to bond it to the cellular core without degrading it.

In the next step of the method of making the inner roof panel 14, after the pre-assembled stack has been heated in an oven, the inner roof panel 14 is formed by subjecting the heated stack to cold-pressing in a mold under a pressure lying in the range $1 \times 10^6$ Pa to $3 \times 10^6$ Pa.

The method of making the inner roof panel 14 comprises a small number of operations that are simple and quick to perform. It uses standard equipment (oven, press) for performing the above-mentioned operations which are well controlled, and therefore entirely suitable for being implemented in the field of manufacturing the inner roof panels, in which the parts are formed at high production throughputs, while also assuring consistent quality and price competitiveness.

The inner roof panels made by performing the method of the invention offer strength that is optimized locally, without suffering from any extra weight or from any extra manufacturing costs.

Figure 4:
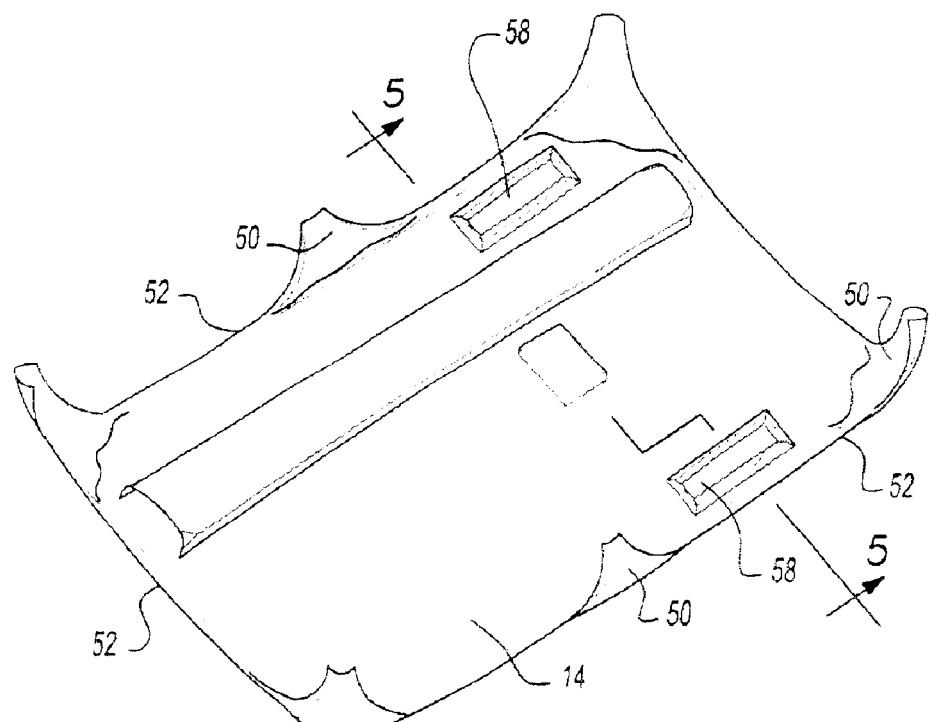
FIG. 4 is a top plan view of a inner roof panel of the present invention having structural members molded therein including a HVAC duct or a wiring conduit, a video panel display mount and air bag receptacles.

Referring now to FIG. 4, there is illustrated a portion of a inner roof panel 14 which is formed in a pressing stage. The inner roof panel 14 may be deep-drawn as is sometimes required as shown by the above-noted prior art.

Figure 5:
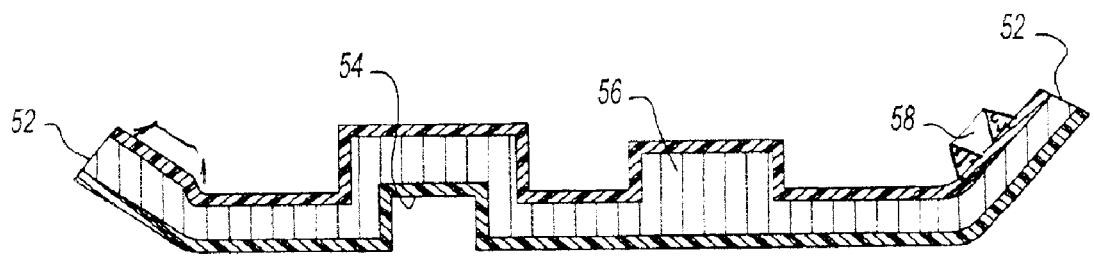
FIG. 5 is a cross-section view taken along the line 5—5 in FIG. 4.

One of the advantageous applications of the method is to make automotive inner roof panels. In particular, such inner roof panels may have attachment and support structures 50 formed at their outer periphery 52 on the edges of the inner roof panel 14. For example, as shown in FIGS. 4 and 5, an inner roof panel 14 having an outer periphery 52 is formed by pressing to include support structures 50 where the inner roof panel is to be connected to the A, B and C pillars of a vehicle.

During the pressing step, a heating, ventilation or air conditioning (HVAC) duct 54 may be formed that would allow air to pass between the outer roof panel 12 and the molded inner roof panel 14. The duct 54 could also function as a wiring conduit instead of an HVAC duct, if desired. A video display mounting structure 56 could also be formed on the molded inner roof panel 14. A side curtain air bag receptacle 58 could also be molded into the inner roof panel 14 between the support structures 50 of the A and B pillars 24 and 30, respectively, of the vehicle 20. The structural component comprising the duct or conduit 54, video display panel mount 56 and side curtain air bag receptacle 58 may be simply formed during the press forming process. The dies used to form the inner roof panel 14 include cavities for forming the structural component in the same step that the skins 40, 44 are bonded to the cellular core 42.

In addition, the molding process may include bonding a headliner layer 46 to the lower surface of the bottom skin 40. The headliner layer 46 is a woven or non-woven fabric that bonds upon application of heat and pressure to the lower surface of the bottom skin. The different thicknesses of the inner roof panel may be formed by crushing or partially deforming the cellular core 42 to a desired depth. When the skins 40, 44 and core 42 are heated, they may be subjected to pressure between upper and lower forming dies sufficient to cause the core 42 to be locally compressed to a reduced thickness.

It is possible to reduce the thickness of the core to about 20% of the original thickness of the layers in their uncompressed state. When the layers are compressed, the thickness of the inner roof panel may be reduced, thereby increasing head room while leaving certain areas uncompressed to provide head impact crush flexibility in the thicker areas. The uncompressed areas may also be used to form the structural components, such as the duct 54, mounting surface 56, or receptacle 58.

Inner roof panels made in accordance with the present invention make it possible to reduce both the cost and weight of the inner roof panel made of steel or other plastic composites while obtaining equivalent mechanical characteristics.

The inner roof panel of the invention may be used in any type of land vehicle, sea craft or aircraft.

While the best mode for carrying out the invention has been described in detail, those familiar with the art to which this invention relates will recognize various alternative designs and embodiments for practicing the invention as defined by the following claims.

What is claimed is:

1. A sandwich-type reinforced composite inner roof panel comprising:
   an upper skin made of a reinforced thermoplastic material;
   a cellular core bonded to the upper skin and made of a thermoplastic material and having an open-celled structure of the tubular or honeycomb cell type; and
   a bottom skin bonded to the cellular core and made of a reinforced thermoplastic material, the upper skin, the cellular core, and the bottom skin being formed to define an inner roof panel having varied thickness with reduced thickness areas in the majority of the inner roof panel and increased thickness areas in localized areas, the increased thickness areas being more readily compressed than the reduced thickness areas to provide integrally formed head impact absorbing members in the inner roof panel, wherein the core is crushed or partially deformed at the reduced thickness areas in the majority of the inner roof panel.

2. The inner roof panel as claimed in claim 1 wherein the cellular core of the inner roof panel is partially compressed to form the reduced thickness areas.

3. The inner roof panel as claimed in claim 1 further comprising at least one covering layer made of a woven or non-woven fabric disposed on a lower surface of the bottom skin wherein the inner roof panel is a carpeted inner roof panel.

4. The inner roof panel as claimed in claim 1 wherein the inner roof panel is substantially flat and is obtained from a single pressing stage.

5. The inner roof panel as claimed in claim 1 wherein the inner roof panel is a deep-drawn inner roof panel and wherein the inner roof panel is obtained from a pair of pressing stages.

6. The inner roof panel as claimed in claim 1 wherein while the inner roof panel is being formed, the upper and bottom skins have a forming temperature in the range approximately 160° C. to 200° C.

7. The inner roof panel as claimed in claim 1 wherein the upper and bottom skins are made of a woven fabric or mat of glass fibers and of a thermoplastic material.

8. The inner roof panel as claimed in claim 7 wherein the thermoplastic material of the upper and bottom skins is a polyolefin.

9. A sandwich-type reinforced composite inner roof panel comprising:
   an upper skin made of a reinforced thermoplastic material;
   a cellular core bonded to the upper skin and made of a thermoplastic material and having an open-celled structure of the tubular or honeycomb cell type; and
   a bottom skin bonded to the cellular core and made of a reinforced thermoplastic material, the upper skin, the cellular core, and the bottom skin being formed to define an inner roof panel having varied thickness with reduced thickness areas in the majority of the inner roof panel and increased thickness areas in localized areas, the increased thickness areas forming a structural com ponent of a vehicle passenger compartment, wherein the core is crushed or partially deformed at the reduced thickness areas in the majority of the inner roof panel.

10. The inner roof panel of claim 9 wherein the structural component is a wiring conduit.

11. The inner roof panel of claim 9 wherein the structural component is a video panel display mount.

12. The inner roof panel of claim 9 wherein the structural component is a receptacle for a side curtain air bag.

13. The inner roof panel of claim 9 wherein the structural component is a heating, ventilation and air conditioning duct.

* * * * *